United States Patent
Hu

(10) Patent No.: US 9,021,216 B2
(45) Date of Patent: Apr. 28, 2015

(54) STORAGE DEVICE AND CONTROLLING METHOD THEREOF

(71) Applicant: Lite-On IT Corporation, Taipei (TW)

(72) Inventor: Lieh-Kuang Hu, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 221 days.

(21) Appl. No.: 13/681,037

(22) Filed: Nov. 19, 2012

(65) Prior Publication Data

US 2014/0101393 A1    Apr. 10, 2014

(30) Foreign Application Priority Data

Oct. 9, 2012   (CN) .......................... 2012 1 0380714

(51) Int. Cl.
```
G06F 12/00      (2006.01)
H04L 29/08      (2006.01)
G06F 3/06       (2006.01)
G06F 13/00      (2006.01)
```

(52) U.S. Cl.
CPC .............. *H04L 29/08* (2013.01); *G06F 3/0604* (2013.01); *H04L 67/06* (2013.01); *G06F 3/06* (2013.01); *G06F 13/00* (2013.01); *G06F 3/0605* (2013.01); *G06F 3/065* (2013.01); *G06F 3/067* (2013.01)

(58) Field of Classification Search
None
See application file for complete search history.

(56) References Cited

U.S. PATENT DOCUMENTS

2007/0079133 A1 *   4/2007   Hsieh ............................ 713/182

* cited by examiner

*Primary Examiner* — Midys Rojas
(74) *Attorney, Agent, or Firm* — McClure, Qualey & Rodack, LLP

(57) ABSTRACT

A controlling method of a storage device is provided. The storage device is in communication with a handheld electronic device. Firstly, a connection status is provided to the handheld electronic device from the storage device, so that the connection status is shown on the handheld electronic device. The connection status indicates that a first storage unit is connected with the storage device. Then, a specified file of the first storage unit is selected according to the connection status shown on the handheld electronic device. Then, a read command is issued from the storage device to the first storage unit, and the specified file of the first storage unit is read in response to the read command. Afterwards, the specified file is stored into the storage device, and a storing result is provided to the handheld electronic device.

10 Claims, 3 Drawing Sheets

STORAGE DEVICE AND CONTROLLING METHOD THEREOF

This application claims the benefit of People's Republic of China Application Serial No. 201210380714.0, filed Oct. 9, 2012, the subject matter of which is incorporated herein by reference.

FIELD OF THE INVENTION

The present invention relates to a storage device, and more particularly to a storage device which is remotely controllable. The present invention also relates to a controlling method of the storage device.

BACKGROUND OF THE INVENTION

As known, external storage devices are widely used in a variety of electronic products. Generally, an external storage device may be connected with a host through various kinds of standardized interfaces. Moreover, according to a command from the host, the external storage device performs a corresponding data accessing operation. In other words, the external storage device is operated according to a control command from the host. However, the external storage device fails to generate the control command by itself.

FIG. 1 is a schematic functional block diagram illustrating a conventional external optical disc drive. As shown in FIG. 1, the external optical disc drive 10 comprises an optical reading/writing device 16, a USB bridge circuit 14, and a USB port 12. Through a USB cable 20, the USB port 12 of the external optical disc drive 10 may be connected to a host (not shown).

For example, the optical reading/writing device 16 is a half-height type optical disc drive for a desktop computer or a slim type optical disc drive for a notebook computer.

For storing data into the external optical disc drive 10, a recordable optical disc is firstly loaded into the optical reading/writing device 16. Then, a write command is issued from the host, and a write data is transmitted from the host to the external optical disc drive 10. By the USB bridge circuit 14, the USB write command and the USB write data are converted into a SATA write command and a SATA data for example. Afterwards, the write data is recorded into the recordable optical disc by the optical reading/writing device 16.

Moreover, the optical reading/writing device 16 as shown in FIG. 1 may be replaced by a hard disc drive or a flash memory. The type of external storage device is correspondingly changed.

From the above discussions, the conventional external storage device is only able to receive the control command but does not have the host function of generating the control command.

SUMMARY OF THE INVENTION

The present invention provides a storage device with the function of a host.

An embodiment of the present invention provides a controlling method of a storage device. The storage device is in communication with a handheld electronic device. Firstly, a connection status is provided to the handheld electronic device from the storage device, so that the connection status is shown on the handheld electronic device. The connection status indicates that a first storage unit is connected with the storage device. Then, a specified file of the first storage unit is selected according to the connection status shown on the handheld electronic device. Then, a read command is issued from the storage device to the first storage unit, and the specified file of the first storage unit is read in response to the read command. Afterwards, the specified file is stored into the storage device, and a storing result is provided to the handheld electronic device.

Another embodiment of the present invention provides a storage device for use with a handheld electronic device. The storage device includes a wireless transmission module, a controlling unit, a storing unit, and a first connecting port. The wireless transmission module is in communication with the handheld electronic device. The controlling unit is connected with the wireless transmission module. The storage device is connected with the controlling unit. The first connecting port is connected with the controlling unit. When the wireless transmission module provides a connection status to the handheld electronic device, the handheld electronic device indicates that a first storage unit is connected with the first connecting port. When a specified file of the first storage unit is selected by the handheld electronic device, the controlling unit issues a read command to the first storage unit. In response to the read command, the specified file of the first storage unit is read by the controlling unit and stored into the storing unit.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Generally, the electronic device with the function of a host may be operated by a user to generate a control command. For example, for storing data, the host is usually equipped with a display screen and an input unit (e.g. a mouse or a keyboard). By viewing the image shown on the display screen, the user may operate the input unit to select a source of a write data. Consequently, the write data may be transmitted from the data source to a target site. Since the configuration of the current external storage device is very simple, the current external storage device is only able to receive the control command but unable to generate the control command. For providing the host function to the external storage device, the display screen and the input device are essential components, and thus the fabricating cost of the external storage device is increased.

For solving the above drawbacks, the present invention provides a storage device for use with a handheld electronic device (e.g. a smart phone or a tablet personal computer). Moreover, the storage device of the present invention has the host function of generating the control command. Hereinafter, the storage device of the present invention will be illustrated by referring to an optical disc drive. It is noted that the storage device of the present invention is not restricted to the optical disc drive.

Figure 1:
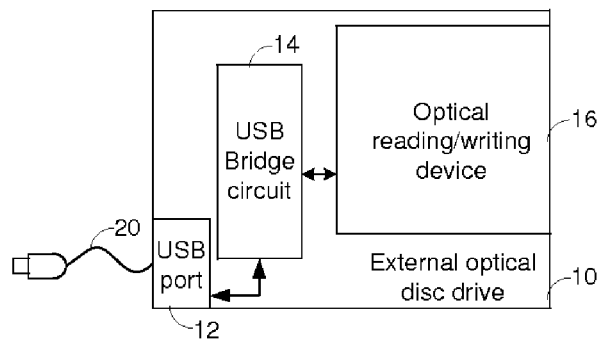
FIG. 1 is a schematic functional block diagram illustrating a conventional external optical disc drive.
Figure 2:
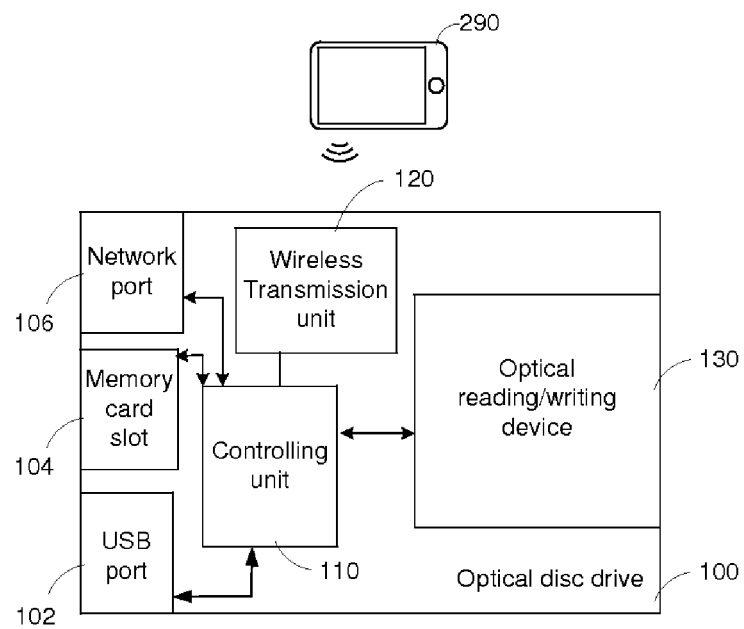
FIG. 2 is a schematic functional block diagram illustrating an optical disc drive according to an embodiment of the present invention.

FIG. 2 is a schematic functional block diagram illustrating an optical disc drive according to an embodiment of the present invention. As shown in FIG. 2, the optical disc drive 100 comprises a controlling unit 110, a wireless transmission unit 120, an optical reading/writing device 130, a USB port 102, a memory card slot 104, and a network port 106.

In an embodiment, the wireless transmission unit 120 is a Bluetooth transmission module. The wireless transmission unit 120 is in communication with a handheld electronic device 290 in a wireless transmission manner. As long as the communication between the handheld electronic device 290 and the wireless transmission unit 120 is achievable, the types of the wireless transmission unit 120 and the handheld electronic device 290 and the transmission manners thereof are not restricted.

Moreover, the optical disc drive 100 may be connected with another electronic device (e.g. a digital camera or a USB flash drive) through the USB port 102. Moreover, the optical disc drive 100 may be connected with a memory card (not shown) through the memory card slot 104. Moreover, the optical disc drive 100 may be connected with a cloud storage service device (not shown) through the network port 106. As shown in FIG. 2, the connecting ports are illustrated by referring to the USB port 102, the memory card slot 104 and the network port 106. It is noted that the connecting ports used in the optical disc drive 100 of the present invention are not restricted. For example, the connecting port includes but is not limited to an eSATA port, a SAS port, a fiber channel port, a thunderbolt port or an IEEE1394 port. Moreover, the optical disc drive 100 may comprise one connecting port or more connecting ports.

In an embodiment, the optical disc drive 100 may be connected with a peripheral storage unit (not shown) through a corresponding connecting port in a wired transmission manner or a wireless transmission manner. Furthermore, by operating the handheld electronic device 290, the optical disc drive 100 may be correspondingly controlled. Consequently, the data stored in the peripheral storage unit may be selected and burnt into the recordable optic disc.

In practice, a web server is installed in the optical disc drive 100 through a software component, and a web page control program is created to control the behaviors of the optical disc drive 100. Consequently, after the handheld electronic device 290 is in communication with the optical disc drive 100, the optical disc drive 100 may be further controlled by simply opening a browser.

Moreover, the manufacturer of the optical disc drive 100 may provide a corresponding application program (App) according to the operation system of the handheld electronic device 290 (e.g. Android, iOX or Windows phone). In a case that the application program is executed by the handheld electronic device 290, the handheld electronic device 290 is in communication with the optical disc drive 100 in order to control the optical disc drive 100.

After the handheld electronic device 290 is in communication with the optical disc drive 100, a control signal from the handheld electronic device 290 is received by the wireless transmission unit 120 of the optical disc drive 100. In response to the control signal, the controlling unit 110 judges a connection status of the network port 106, the memory card slot 104 or the USB port 102. Then, the connection status is transmitted to the handheld electronic device 290 through the wireless transmission unit 120 and shown on a display screen of the handheld electronic device 290. That is, after the peripheral storage unit has been checked by the controlling unit 110, the connection status is transmitted to the handheld electronic device 290.

After the connection status of the optical disc drive 100 is realized by the handheld electronic device 290, the data of the peripheral storage unit which is connected with the optical disc drive 100 may be further acquired. Accordingly, the files stored in the peripheral storage unit are browsed by user on the handheld electronic device 290. For example, in a case that a solid state drive (e.g. a USB flash drive) is connected with the USB port 102, the USB flash drive is served as a storage unit. Under this circumstance, the user may operate the handheld electronic device 290 to control the USB flash drive through the optical disc drive 100 and browse the files stored in the USB flash drive. Consequently, a file directory is shown on the display screen of the handheld electronic device 290. Meanwhile, a specified file may be selected by using the handheld electronic device 290 and burnt into the recordable optic disc.

Similarly, in a case that a memory card such as a SD memory card is inserted into the memory card slot 104, the SD memory card is served as a storage unit. Under this circumstance, the user may operate the handheld electronic device 290 to control the SD memory card and browse the files stored in the SD memory card through the optical disc drive 100. Consequently, a file directory is shown on the display screen of the handheld electronic device 290. Meanwhile, a specified file may be selected by using the handheld electronic device 290 and burnt into the recordable optic disc.

Figures 3A, 3B:
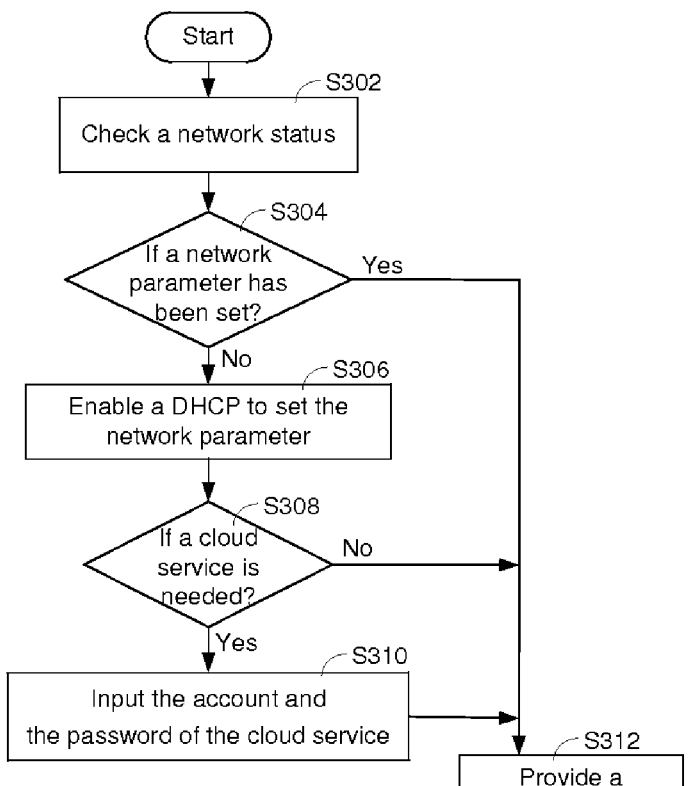
FIG. 3A schematically illustrating a network port detecting process according to an embodiment of the present invention.
FIG. 3B schematically illustrates the connection status shown on the handheld electronic device according to an embodiment of the present invention.

Similarly, in a case that the network port 106 is connected to a network, a network port detecting process as shown in FIG. 3A will be performed by the controlling unit 110. FIG. 3A schematically illustrating a network port detecting process according to an embodiment of the present invention. Firstly, a network status is checked by the controlling unit 110 (Step S302). Then, the step S304 is performed to judge whether a network parameter has been set or not. If the network parameter has been set, the connection status of the network port 106 is provided (Step S312).

On the other hand, if the network parameter has not been set, a dynamic host configuration protocol (DHCP) is used to set the network parameter (Step S306). Then, an inquiry message is shown to inquire the user whether a cloud service is needed (Step S308). If the cloud service is not needed, the connection status of the network port 106 is provided (Step S312). On the other hand, if the cloud service is needed, a user account and a password for the cloud service are inputted (Step S310) and then connection status of the network port 106 is provided (Step S312).

FIG. 3B schematically illustrates the connection status shown on the handheld electronic device according to an embodiment of the present invention. After the USB port 102 and the memory card slot 104 are connected with the USB flash drive and the SD memory card, respectively, the physical connection status shown on the handheld electronic device 290 indicates "USB SD". Meanwhile, the data of the USB flash drive and the SD memory card can be read.

After the network port 106 is connected with a network attached storage device (NAS) through a local area network, the local area connection status shown on the handheld electronic device 290 indicates "NAS". Meanwhile, the data of the network attached storage device can be read.

In a case that the network port 106 is connected with a cloud storage service device, the cloud service connection status shown on the handheld electronic device 290 indicates the readable cloud storage service device (e.g. Dropbox, iCloud).

Figure 4:
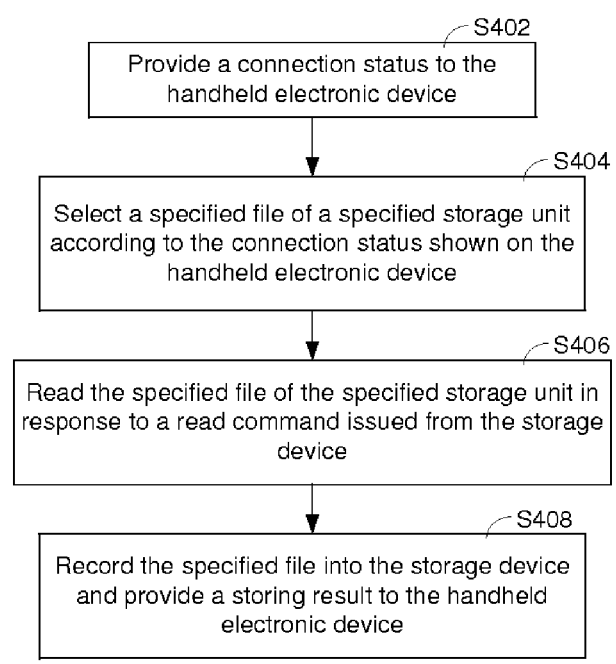
FIG. 4 schematically illustrates a flowchart of a controlling method of a storage device according to an embodiment of the present invention.

FIG. 4 schematically illustrates a flowchart of a controlling method of a storage device according to an embodiment of the present invention. Firstly, a connection status is provided to the handheld electronic device from the storage device (Step S402). Then, according to the connection status shown on the handheld electronic device, a specified file of a specified storage unit is selected (Step S404). Then, according to the user's selection, the storage device issues a read command. In response to the read command, the specified file of the specified storage unit is read by the storage device (Step S406). After the specified file is received by the storage device, the specified file is recorded into the storage device and a storing result is provided to the handheld electronic device (Step S408).

For example, in a case that the connection status shown on the handheld electronic device is viewed by the user, the files stored in the peripheral storage unit which is connected to storage device (e.g. the USB flash drive, the SD memory card, the NAS device, the Dropbox cloud storage service device or the iCloud cloud storage service device) can be browsed on the handheld electronic device and read by the storage device. After at least one file is selected through the handheld electronic device, the controlling unit of the storage device may be controlled to generate a read command. In response to the read command, the specified file of the specified storage unit is read.

After the specified file is received by the storage device, the specified file may be further stored into the storage device. In addition, a storing result indicating a successful storing message is transmitted to and shown on the handheld electronic device. On the other hand, if any problem occurs during the process of storing the specified, a storing result indicating a failed storing message is transmitted to and shown on the handheld electronic device.

In the above embodiment, the storage device is illustrated by referring to an optical disc drive. Alternatively, the storage device may be a hard disc drive, a solid state drive or any other suitable storage device. Depending on the type of the storage device, the optical reading/writing device 130 of the optical disc drive 100 as shown in FIG. 2 is replaced by a corresponding storage device.

From the above descriptions, the present invention provides a storage device. The storage device is controlled by a handheld electronic device. Consequently, the peripheral storage units which are connected with the storage device may be controlled by the storage device and the handheld electronic device, and the files of the peripheral storage units may be selected and further stored into the storage device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A controlling method of a storage device, the storage device being in communication with a handheld electronic device and being connected with a peripheral storage unit, the controlling method comprising steps of:
    providing a connection status between the storage device and the peripheral storage unit to the handheld electronic device from the storage device, so that the connection status is shown on the handheld electronic device, wherein the connection status indicates that the peripheral storage unit is connected with the storage device;
    selecting a specified file stored in the peripheral storage unit according to the connection status shown on the handheld electronic device, wherein files stored in the peripheral storage unit is browsed on the handheld electronic device, and the specified file of the files stored in the peripheral storage unit is selected through the handheld electronic device;
    issuing a read command from the storage device to the peripheral storage unit, and reading the specified file stored in the peripheral storage unit in response to the read command; and
    storing the specified file into the storage device, and providing a storing result to the handheld electronic device.

2. The controlling method as claimed in claim 1, further comprising a step of issuing a control signal from the handheld electronic device to the storage device, wherein in response to the control signal, the connection status is generated by the storage device.

3. The controlling method as claimed in claim 1, wherein the storage device further comprises a wireless transmission unit, which is in communication with the handheld electronic device.

4. The controlling method as claimed in claim 1, wherein the handheld electronic device is a smart phone or a tablet personal computer.

5. The controlling method as claimed in claim 1, wherein the peripheral storage unit is a solid state drive, a memory card, a network storage unit or a cloud storage service device.

6. A storage device for use with a handheld electronic device, the storage device being connected with a peripheral storage unit, the storage device comprising:
    a wireless transmission module in communication with the handheld electronic device;
    a controlling unit connected with the wireless transmission module;
    a storing unit connected with the controlling unit; and
    a first connecting port connected with the controlling unit, wherein when the wireless transmission module provides a connection status between the first connecting port of the storage device and the peripheral storage unit to the handheld electronic device, the handheld electronic device indicates that the peripheral storage unit is connected with the first connecting port, and files stored in the peripheral storage unit is browsed on the handheld electronic device, wherein when a specified file stored in the peripheral storage unit is selected through the handheld electronic device, the controlling unit issues a read command to the peripheral storage unit, wherein in response to the read command, the specified file stored in the peripheral storage unit is read by the controlling unit and stored into the storing unit of the storage device.

7. The storage device as claimed in claim 6, wherein in response to a control signal issued from the handheld electronic device to the wireless transmission module, the connection status is generated by the controlling unit.

8. The storage device as claimed in claim 6, wherein the wireless transmission module is a Bluetooth transmission module.

9. The storage device as claimed in claim 6, wherein the handheld electronic device is a smart phone or a tablet personal computer.

10. The storage device as claimed in claim 6, wherein the peripheral storage unit is a solid state drive, a memory card, a network storage unit or a cloud storage service device.

* * * * *